United States Patent
Kitts et al.

(10) Patent No.: US 11,997,333 B2
(45) Date of Patent: *May 28, 2024

(54) SYSTEM AND METHOD FOR TRACKING ADVERTISER RETURN ON INVESTMENT USING SET TOP BOX DATA

(71) Applicant: ADAP.TV, Inc., New York, NY (US)

(72) Inventors: Brendan Kitts, Seattle, WA (US); Dyng Au, Seattle, WA (US); Brian Burdick, Newcastle, WA (US)

(73) Assignee: ADAP.TV, INC, Dulles (VA)

( * ) Notice: Subject to any disclaimer, the term of this patent is extended or adjusted under 35 U.S.C. 154(b) by 154 days.

This patent is subject to a terminal disclaimer.

(21) Appl. No.: 17/303,301

(22) Filed: May 26, 2021

(65) Prior Publication Data
US 2021/0281898 A1  Sep. 9, 2021

Related U.S. Application Data

(63) Continuation of application No. 16/657,387, filed on Oct. 18, 2019, now Pat. No. 11,051,060, which is a continuation of application No. 14/046,904, filed on Oct. 4, 2013, now Pat. No. 10,499,099.

(60) Provisional application No. 61/709,889, filed on Oct. 4, 2012.

(51) Int. Cl.
| | |
|---|---|
| *H04N 21/258* | (2011.01) |
| *G06Q 30/0241* | (2023.01) |
| *H04N 21/442* | (2011.01) |
| *H04N 21/81* | (2011.01) |

(52) U.S. Cl.
CPC ... *H04N 21/25891* (2013.01); *G06Q 30/0241* (2013.01); *H04N 21/44204* (2013.01); *H04N 21/812* (2013.01)

(58) Field of Classification Search
CPC ....... H04N 21/25891; H04N 21/44204; H04N 21/812; G06Q 30/0241
See application file for complete search history.

(56) References Cited

U.S. PATENT DOCUMENTS

| 8,060,398 B2 | 11/2011 | Canning et al. |
|---|---|---|
| 8,365,213 B1 | 1/2013 | Orlowski |
| 2009/0077579 A1* | 3/2009 | Li .................. H04N 7/173 725/34 |

(Continued)

OTHER PUBLICATIONS

Rick Dedrick, A Consumption Model for Targeted Electronic Marketing, Intel Architecture Labs, 1995, pp. 1-2.

*Primary Examiner* — Alexandru Cirnu
(74) *Attorney, Agent, or Firm* — Bookoff McAndrews, PLLC

(57) ABSTRACT

A processing device receives set-top box data, sales data, and advertising data. The processing device associates set-top boxes from the set-top box data with viewers and calculates advertising exposure events for advertisements. The processing device further calculates, for each viewer, an advertising weight as a function of number of exposures of the advertisement as applied to the viewer based on the advertising exposure events. The processing device further calculates, for each viewer, a score representing a degree-of-targetedness between an advertisement campaign and the viewer. The processing device manages the advertisement campaign based on the advertising weight and the degree-of-targetedness.

14 Claims, 10 Drawing Sheets

(56) References Cited

U.S. PATENT DOCUMENTS

| | | | |
|---|---|---|---|
| 2009/0271819 A1* | 10/2009 | Cansler | H04N 21/435 |
| | | | 725/34 |
| 2010/0076848 A1 | 3/2010 | Stefanik et al. | |
| 2010/0161492 A1 | 6/2010 | Harvey et al. | |
| 2012/0284746 A1 | 11/2012 | Evans et al. | |
| 2013/0091019 A1 | 4/2013 | Mallon et al. | |

* cited by examiner

SYSTEM AND METHOD FOR TRACKING ADVERTISER RETURN ON INVESTMENT USING SET TOP BOX DATA

RELATED APPLICATIONS

This patent application is a continuation of and claims the benefit of priority to U.S. application Ser. No. 16/657,387, filed Oct. 18, 2019, which is a continuation of and claims the benefit of priority to U.S. application Ser. No. 14/046,904, filed Oct. 4, 2013, now U.S. Pat. No. 10,499,099, issued Dec. 3, 2019, which claims the benefit under 35 U.S.C. 119(e) of U.S. Provisional Application No. 61/709,889, filed Oct. 4, 2012, the entireties of which are herein incorporated by reference.

TECHNICAL FIELD

Embodiments of the present disclosure relate to the field of media advertising and, more particularly, to tracking and managing advertising campaigns.

BACKGROUND

Tracking return on investment (ROI) from television (TV) is an unsolved problem for advertising. Some of these attempts are set forth below.

A. IPTV—Many commentators have written that efforts such as internet protocol enabled television (IPTV) will eventually enable TV conversions to be tracked via conversion tracking pixels similar to those in place today throughout the web. IPTVs obtain their TV component from the internet and use hypertext transport protocol (HTTP) for requesting content. However, there are many technical challenges before tracking conversions using IPTVs becomes a reality. Today, only about 8% of US TV households have IP enabled TV. Attempts to introduce IPTVs such as Google® TV and Apple® TV have met with only lukewarm interest. Even if web-like conversion tracking becomes possible using TV, it still won't capture all of the activity such as brand recognition leading to delayed conversions, and purchasing at retail stores.

B. RFI Systems—Some companies have experimented with methods for enabling existing TVs to be able to support a direct "purchase" from "the consumer's lounge room" using present-day Set-top box systems and remote controls. Some system providers have developed an on-screen "bug" that appears at the bottom of the screen, and asks the consumer if they would want more information or a coupon. The consumer can click on their remote control to accept. Although promising, adoption of remote control RFI systems is constrained by lack of hardware support and standards. These systems also have the same disadvantages of IPTV, in being unable to track delayed conversions.

C. Panels—One of the most common fallbacks in the TV arena—when faced with difficult-to-measure effects—is to use volunteer, paid panels to find out what people do after they view advertisements. There are several companies that use panels to try to track TV exposures to sales. One advantage of this method is that it makes real-time tracking possible. However, in all cases, the small size of the panel (e.g., 25,000 people far some panels) presents formidable challenges for extrapolation and difficulty finding enough transactions to reliably measure sales. Another problem with the panel approach is the cost of maintaining the panels.

D. Mix Models—If data from previous campaigns has been collected, then it may be possible to regress the historical marketing channel activity (e.g., impressions bought on TV ads, radio ads, web ads, print, etc.) against future sales. Unfortunately, such an approach offers no help if the relationships change in the future. Moreover, such an approach does not provide real time tracking. In addition, historical factors are rarely orthogonal—for example, retailers often execute coordinated advertising across multiple channels correlated in time on purpose in order to exploit seasonal events. This can lead to a historical factors matrix that aliases interactions and even main effects. Even if there are observations in which all main effects vary orthogonally, in practice them may be too few cases for estimation.

E. Market Tests—Market Tests overcome the problems of mix models by creating orthogonal experimental designs to study the phenomena under question. TV is run in some geographic areas and not others, and sales then compared between the two. Market tests rely on local areas to compare treatments to controls. One problem typical to market tests is their inability to be used during a national campaign. Once a national television ad campaign is under way, there are no longer any controls that aren't receiving the TV signal of the campaign. This causes additional problems—for example, a market test might be executed flawlessly in April, and then a national campaign starts up in May. However, some external event is now in play during May, and the findings compiled meticulously during April are no longer valid. This is a problem of the market test being a "research study" that becomes "stale" as soon as the national campaign is started. Thus, market tests also fail to provide real time tracking.

None of the above methods or techniques provide practical methods to effectively track the effects of TV advertising in real-time in a national campaign. The lack of conversion tracking on TV has arguably led to a proliferation of untargeted, irrelevant ads. Solving the TV conversion tracking problem could be of great significance for computational advertising.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

It is generally difficult to track the effects of TV advertising (e.g., track whether a TV advertisement resulted in a purchase in a store or online). Providing systems and methods to track the effects of TV advertising in real time may allow more complete cost and revenue metrics to be maintained for the TV advertising, which may in turn allow for better targeting, optimization, and control of advertisements because of visibility into their performance.

The system and method described in embodiments exploit an important new source of data to perform conversion tracking. Set-top box data makes it possible to measure advertisement (ad) delivery to specific households. Each household receives a certain exposure of ads, and then either converts or does not convert. Analyzing the ad weight load and targeting, it is possible to identify how consumers are responding to television (- IV) advertising, In addition, it is also possible to simply track how well an advertising campaign is doing at getting ads in front of buyers. Embodiments provide advantages including being able to utilize large populations, and being implementable using existing television hardware.

In embodiments, set-top box data is received and processed. The set-top box data is then combined with three other data sources to be able to see ad exposures and conversions.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Figure 1:
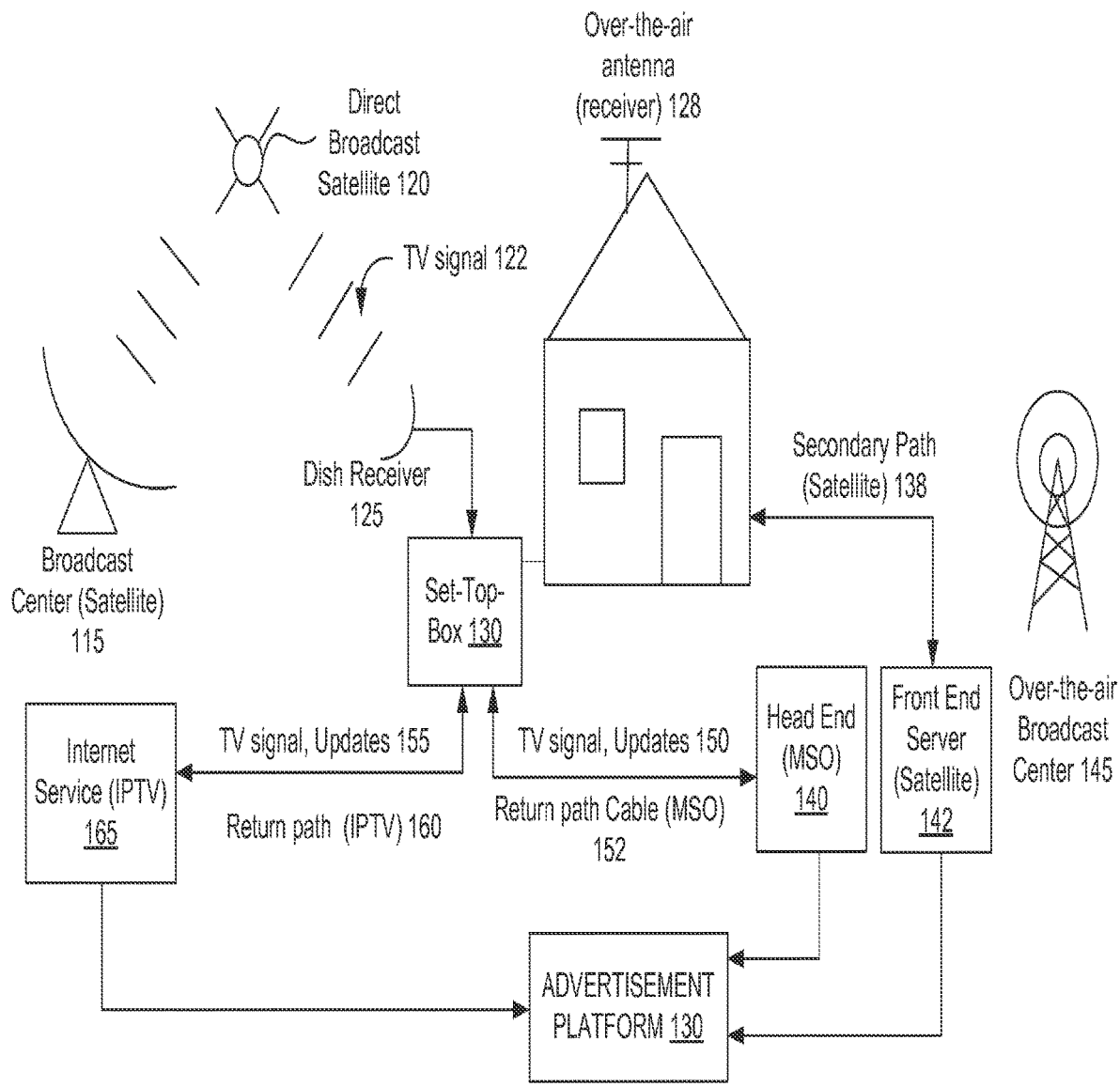
FIG. 1 illustrates four different television (TV) providers to a household, as well as return path data for each.

FIG. 1 illustrates four different television (TV) providers to a household, as well as return path data for each. The four different TV providers include a satellite TV provider, a cable TV provider, an internet protocol TV (IPTV) provider and an over-the-air TV provider. The satellite TV provider includes a broadcast center 115 that directs TV signals to a direct broadcast satellite 120. The direct broadcast satellite 120 then directs a TV signal 122 to a dish receiver 125 of a household. The TV signal is transmitted from the dish receiver 125 to a set-top box 130, which translates the TV signal 122 into a format that can be displayed on a TV. The set-top box 130 may receive schedule updates, pay-per-view (PPV) data, video on demand (VOD) data and/or system updates from a satellite front end server 142 on a secondary path 138. The secondary path 138 may be a dial-up phone connection, a transmission control protocol/internet protocol (TCP/IP) connection, or other connection. The secondary path 138 may additionally act as a return path that the set-top box 130 may use to provide data to the front end server 142. The data may include stored set-top box data, credit card data, video rental data, and so on.

The cable TV provider includes a head end multiple system operator (MSO) 140 that provides a TV signal and/or updates to the set-top box 130 over a cable connection, which may be a coaxial cable connection in some implementations. The set-top box 130 may additionally provide set-top box data to the head end 140 via a return path 152 on the cable connection.

The internet protocol television (IPTV) provider includes an internet service 165 that may connect to the set-top box 130 via a TCP/IP connection. Via the TCP/IP connection, the internet service 165 may provide a TV signal and updates 155, and may receive set-top box data in a return path 160.

The over-the-air TV provider includes an over-the-air broadcast center 145 that broadcasts an over-the-air TV signal. An over-the-air antenna 128 receives the broadcast signal, and may route the over-the-air broadcast signal to set-top box 130 or directly to a TV.

A single set-top box 130 may receive all of the above mentioned TV signals. Alternatively, different set-top boxes may be configured to receive a particular type of TV signal. For example, the cable provider may provide a set-top box for the cable TV signal, and the satellite TV provider may provide a set-top box for the satellite TV signal.

Set-top boxes 130 are small devices that interpret a TV signal (e.g., a satellite or cable TV signal), and turn it into content that can be displayed by television sets. Set-top boxes 130 emerged due to the rapidly growing variety of TV signals and services that occurred from 1990 to 2010, the increase of cable and satellite subscription over the same period, and the move to all digital broadcasting in the United States in 2009. Amongst other things, Set-top boxes (i) demodulate cable signals, (ii) interpret High Definition TV (HDTV), (iii) support Video On Demand (VOD) and Pay per view (PPV), (iv) support DVR (digital video recorder) functionality, and (v) Satellite, Cable, IPTV and Terrestrial antenna broadcast digital protocols.

Set-top boxes have quietly revolutionized the television industry. Since 1996, set-top boxes have increased from about 79% of households to over 91.5% in the United States. Many households now have a set-top box with a return path capability. The specific kind of return path varies with the data connection; for example IPTV installations can send data back in real-time, where-as Direct Broadcast Satellite often utilizes the phone line to update the unit once per day. Usage data may be collected at Head-end (MSO) 140, Front End Servers (Satellite) 142 and Internet Service Provider receiver servers (IPTV) 165.

In one embodiment, advertisement platform 180 connects to the head end 140, front end server 142 and/or IPTV server 165. Advertisement platform 180 may receive set-top box data (e.g., set-top box event records) from these systems, and combines the set-top box data with sales data and/or additional data to determine conversion probability for ads and to determine a quantity of purchasers who are exposed to the ads.

Figure 2:
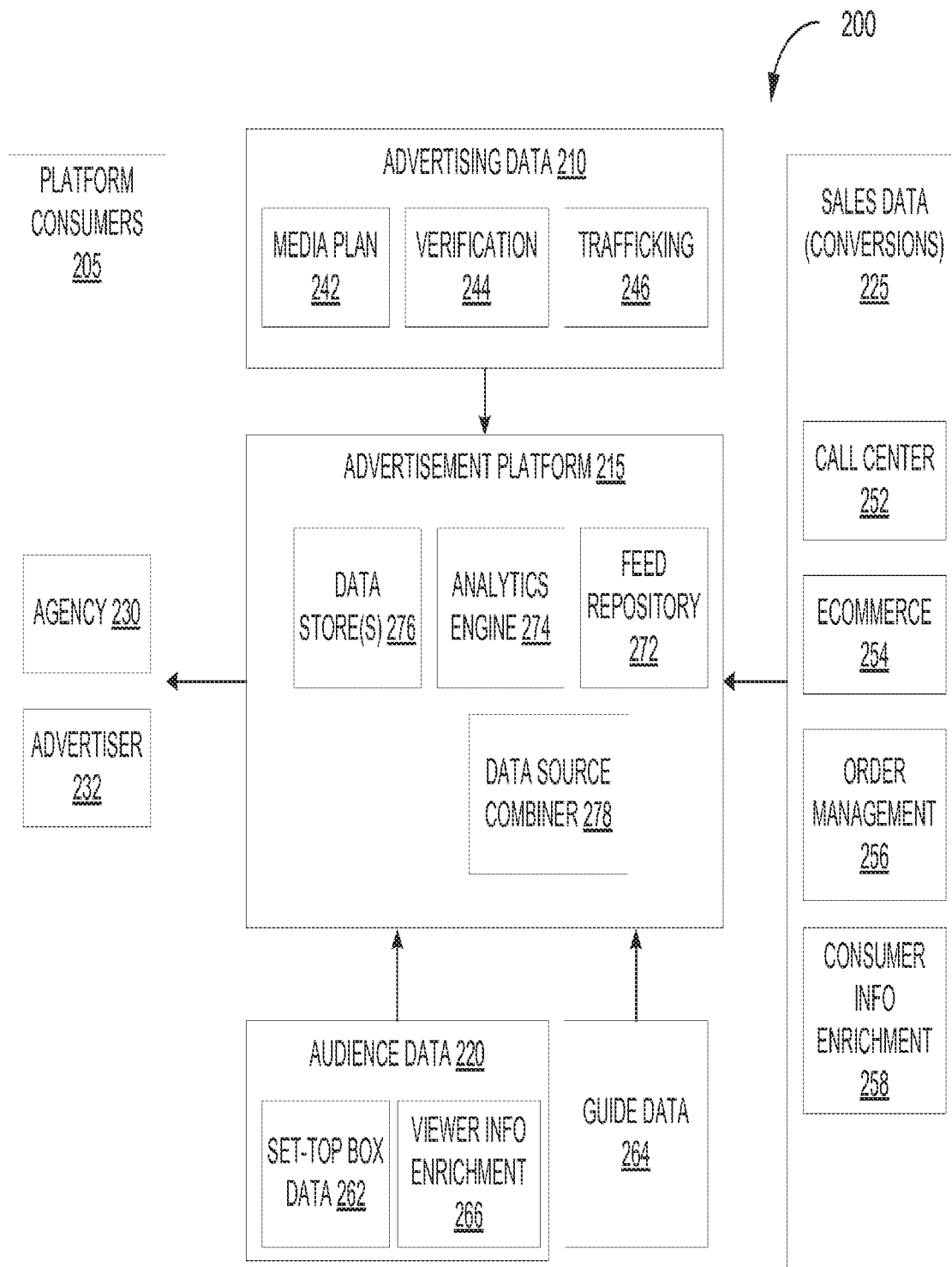
FIG. 2 is a block diagram of a system architecture in which embodiments of the present invention described herein may operate.

FIG. 2 is a block diagram of a system architecture 200 in which embodiments of the present invention described herein may operate. The system architecture 200 enables an advertisement platform 215 (e.g., the Lucid Commerce®— Fathom Platform®) to collect data relevant to an advertising campaign, to set up experiments, to track an advertising campaign in real time, and to otherwise control an advertisement campaign. An advertising campaign may be a national advertising campaign, a state wide advertising campaign, a city wide advertising campaign, an advertising campaign targeting specific zip codes, and so forth. The system architecture 200 includes an advertisement platform 215 connected to platform consumers 205 and systems that provide advertising data 210, audience data (also referred to as usage data) 220, sales data 225, and guide data 264.

The advertisement platform 215 receives as input the advertising data 210, audience data 220, sales data 225, and guide data 264. The advertising data 210 may include media plan data (e.g., data indicating advertisements to run, target conversions (e.g., number of sales), target audiences, a plan budget, and so forth), verification data 244 (e.g., data confirming that advertisements were run), and trafficking data 246 (e.g., data indicating what advertisements are shipped to which TV stations). Preferably, all the advertising data 210 about what media is being purchased, run, and trafficked to stations is collected and provided to the advertisement platform 215 to ensure that there is an accurate representation of the television media. This may include setting up data feeds for the media plan data 242, verification data 244, and trafficking data 246.

The sales data 225 (also referred to as conversion data) includes data on sales of products and/or services that are being advertised. Sales data 225 may include, for example, call center data 252, electronic commerce (ecommerce) data 254 and order management data 256. The advertisement platform 215 may set up a data feed to one or more call centers to receive accurate data about phone orders placed by the call centers for the advertised products or services. Additionally, recurring data feeds may be set up with the vendor or internal system of the advertiser that records orders that come in from the advertiser's website (ecommerce data 254). Recurring data feeds with the order vendor or internal system that physically handles the logistics of billing and/or fulfillment may also be established (order management data 256). This may be used for subsequent purchases such as subscriptions and for returns, bad debt, etc. to accurately account for revenue. This data may also originate from one or more retail Point of Sale systems.

The advertising platform 215 may generate a record for every caller, web-converter, and ultimate purchaser of the advertised product or server that gets reported via the sales data 225. The advertising platform 215 may append to each record the data attributes for the purchasers in terms of demographics, psychographics, behavior, and so forth. Such demographic and other information may be provided by data bureaus such as Experian®, Acxiom®, Claritas®, etc. In one embodiment, advertiser data 225 includes consumer information enrichment data 258 that encompasses such demographics, behavior and psychographics information.

Audience data 220 may include set-top box data 262 (e.g., set-top box records) and/or viewer information enrichment data 266. The viewer information enrichment data 266 may be similar to the consumer info enrichment data 258, but may be associated with viewers of television programming as opposed to consumers of goods and services. A feed of such viewer data 266 may include demographic, psychographic, and/or behavioral data.

A set-top box event record comprises the following topic: (DeviceID, EventID, DataTime, TimeZone), where DateTime is recorded by the local set-top box unit. DeviceID is a unique identifier for the set-top box, the EventID is a field that indicates a type of event, DateTime indicates the date and time the event occurred, and TimeZone indicates the time zone in which the set-top box is located. Each of these tuples represents a remote control key-press or state change event. The set-top box events that are used in one embodiment are the "tune" events in which the user navigates and selects a channel, and the on/off events, in which the user turns on or off the set-top-box. Set-top box events are filtered by data source combiner 278 in one embodiment to isolate the tune events and on/off events.

Data source combiner 278 may determine session boundaries for user viewing sessions (also referred to as session events) based on the filtered set-top box event records. In one embodiment, there are two methods for identifying session boundaries. In a first method, set-top box on/off events are used to identify a session boundary. Sometimes consumers will switch set-top boxes off after viewing, and on to start viewing, and these provide a very convenient way of identifying session starts and ends. In a second method, inactive periods are used to identify a session boundary. If there are no detected remote control key presses for a certain number of hours, we determine that a session has ended.

Figure 3:
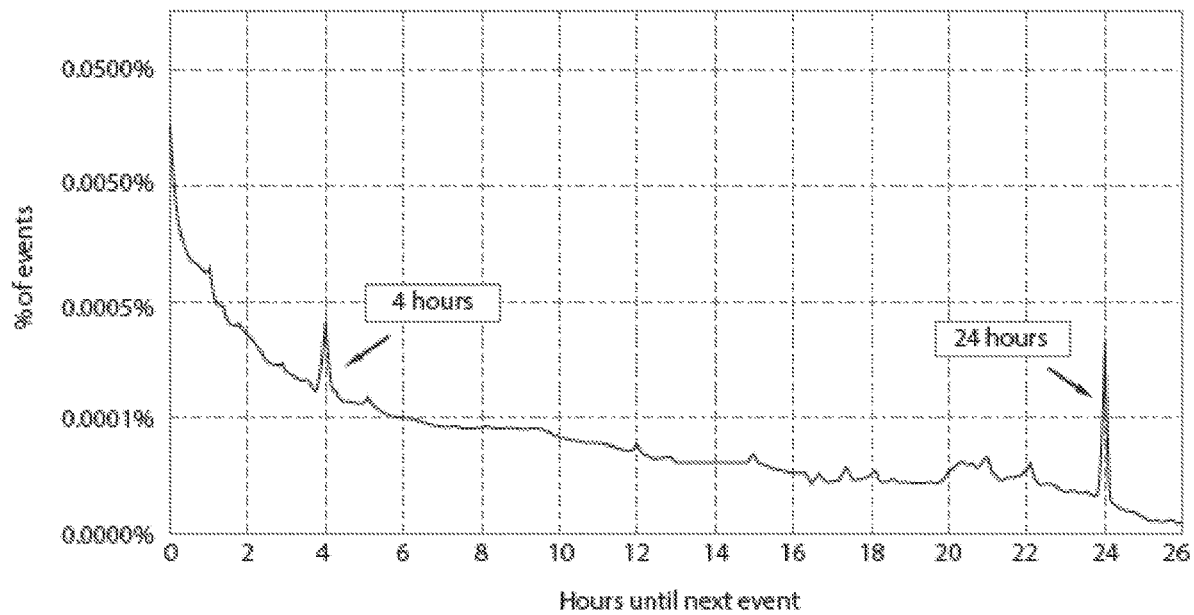
FIG. 3 illustrate a number of hours between tune events by set-top-boxes.

FIG. 3 illustrates a number of hours between tune events by set-top-boxes. Based on an analysis of the time between last key press and off events for set-top box data, there is a spike in off events after 4 hours of inactivity that may be due to most viewing being prime-time followed by a "cliff" around 4 hours later which coincides with the sleep period. Additionally, based on an analysis of the time between key press events of any kind, there are spikes every half hour, which seem to be related to users switching to another program after viewing a previous program. There are also large spikes in tune events at 4 and 24 hours. The 24 hour spike suggests that people may be watching TV at around the same time each day. Based on the suggestive spikes at 4 hours, in one embodiment 4 hours is used as the inactive period setting. In another embodiment, 6 hours of inactivity is used for creating a session boundary.

Figure 4:
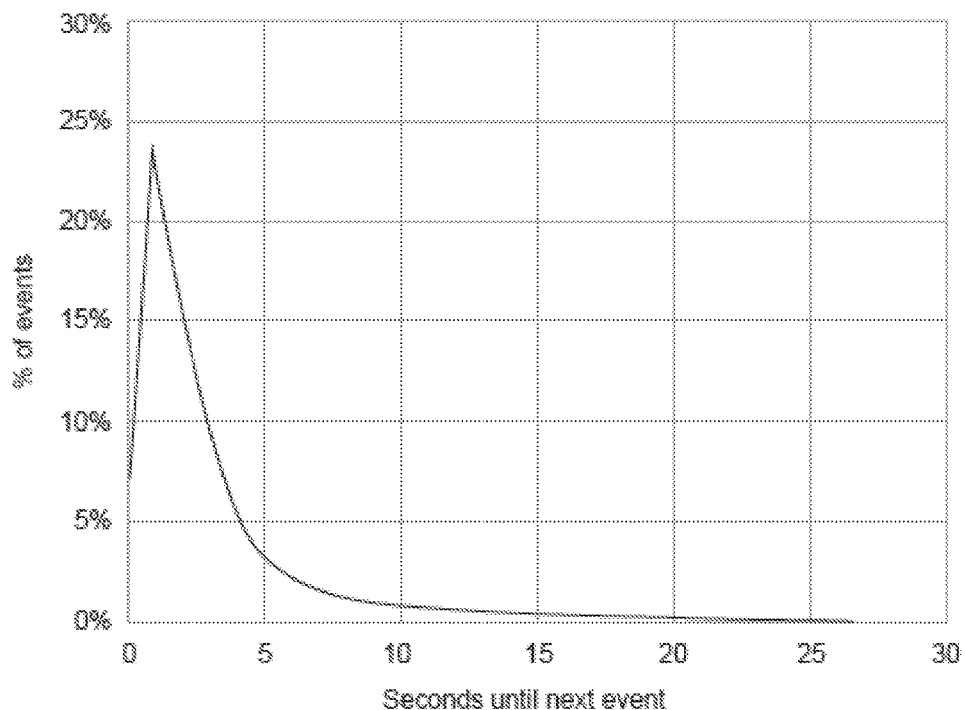
FIG. 4 shows the average time between tune events.

One of the most salient behaviors in set-top boxes are the large number of station request events that occur in quick succession as users "surf" channels looking for a program to watch. FIG. 4 shows the average time between tune events. Over 70% of events are "tune surf" events. Tune surf events may be filtered by ensuring that the time a viewer spent on station needs to be at least 10% of a specified viewing period (e.g., 1.5 minutes of each 15 minute bucket) for a station viewing session to be generated from the set-top box event records. In some instances a user may jump back and forth between two programs, in which case tune events for neither program would be filtered out.

Some set-top box records for people who leave their set-top boxes on all of the time should also be filtered out. Although very high viewing levels could indicate bad data, as a group, heavy viewers are actually the highest converters in the data. Heavy viewers have been shown to convert 7 times higher than the lowest hour viewing segment. If the system normalizes by impressions, on a per impression basis, the high TV consumption group and low consumption group actually have similar conversions per impression. This suggests that if ads are displayed to humans, they tend to convert. In order to fiber out the most extreme viewing behavior, but leaving in place the converters, data source combiner 278 may filter out the most extreme heavy viewers who view more than 99% of the population.

The guide service data 264 may include the programming of what is going to run on television and/or what was run on television on various channels at various times.

All of the feeds of the various types of data may be received and stored into a feed repository 272 by the advertisement platform 215. All of the underlying data may be put into production and all of the data feeds may be loaded into an intermediate format for cleansing, adding identifier's, etc.

The advertisement platform 215 may ingest all of the data from the data feeds. Data source combiner 278 coordinates the data from the different data sources. In one embodiment, data source combiner 278 matches user identifiers in records from the different data sources (e.g., sales records and set-top box records), and combines these records with the matching user identifiers into a single combined record. Additionally, guide data and/or advertisement data may be combined with records from the set-top box data based on time and channel information. Combined records may he used to determine conversion rates, conversion probability, a number of converters who were exposed to ads from the advertising campaign, and so on.

The data source combiner 278 joins the set-top box data 262 to electronic programming guide (EPG) data 264 to identify the programs that were running during each of these determined viewing sessions on each of the viewed stations. These are on average 7,154 distinct named programs and 54,086 30 minute airing timeslots each day not including local broadcasts.

The processing described above may avoid illusory view events. After joining the guide data 264 to the set-top-box data 262, the data source combiner 278 creates a set of set-top box viewing events as the following tuple: STBView=(DeviceID, StationEvent, Program, DateTime, TimeZone). StationEvent indicates which station is associated with a viewing event, and program indicates which TV program was aired on the station at the recorded date and time (based on DateTime and TimeZone). The DeviceID can be linked to the billing name and address for the person who subscribes to the set-top box through an anonymization process described below.

When the customer purchases a product, the advertiser obtains information about the person's name and address as part of a credit card transaction. This information can be used to create conversion data for modeling the impact of TV advertising. Advertiser conversion data can include purchase value information, segments assigned by the Advertiser, acquisition and churn date. Acquisition date may be compared against viewing events, and the system may sum the ad exposures that occurred prior to the conversion. Conversion data contains the following salient fields: Conversion=(CustomerName, Address, DateTime, TimeZone).

the billing name and address (or an anonymized identifier representing the billing name and/or address) from the set-top box data may be matched against CustomerName and/or address from the sales data (or an anonymized identifier representing the purchaser name and/or address) to connect viewing events to sales events (conversions).

The system next identifies whether the set-top box viewer saw ads for a particular advertisement campaign. Ad occurrence data is recorded by several media tracking services including SQAD and BVS. SQAD collects their data from stations, where-as BVS embeds digital watermarks into the ads which are detectible in the video stream as it is received by television sets around the country. Based on ad occurrence data, there are approximately 19 million TV ad airings per month in the United States, which span the entirety of national, local, broadcast and cable networks. For conversion tracking purposes, the system filters the ad occurrence data to the one advertiser for whom conversions are being tracked. The system then has a tuple which indicates the times that the ad was aired. The tuple is as follows: AdOcc= (Station, Program, DateTime, TimeZone). These tuples may be matched against station, program, time and time zone fields in the combined set-top box data and guide data to identify which viewing events resulted in ad impressions. A timing between the sales event and viewing events may then be used to attribute a particular conversion event to one or more ad impressions.

After the combined records are generated that match viewing events, purchase events and ad events, the data may be loaded into one or more data stores 276 (e.g., databases) for use with any upstream media systems. These combined records may be used to support media planning through purchase suggestions, revenue predictions, pricing suggestions, performance results, etc. Additionally, an analytics engine 274 of the advertisement platform 215 may use the data to set up experiments, perform real time tracking of an advertisement campaign, optimize an advertisement campaign in real time, determine a landscape for an advertisement campaign, and so forth.

In one embodiment an objective is to join each of the four data sources together and then to start counting ad exposures on each viewer and identify the probability of conversion as a function of weight and targeting. Analytics engine 274 uses the combined records to determine probability of conversion as a function of ad weight and degree of targetedness.

We will define Ad Weight A as 1000*the number of ads viewed by an individual per week prior to converting. Ad weight may be computed as follows:

$$A(i, \alpha, \tau) =$$

$$\frac{1000 \cdot imp(i, \alpha)}{weeks(i) \cdot TVHH(i)} = \frac{1000 \cdot \sum_{m:v(i,m) \wedge occ(a,m) \wedge a \in \alpha} 1}{(1/7) \cdot \Delta \left[ \min t(m), \begin{cases} T(i), \text{ if } c(i) \\ \max t(m), \text{ otherwise} \end{cases} \right]}$$

$$\forall a \in \alpha, \forall m : v(i, m) \wedge \ldots$$

$$t(m) \geq \min t(n) \wedge t(m) \leq \max t(n) : \forall occ(a, n) \wedge \ldots$$

$$t(m) \leq \tau \wedge t(m) \geq \tau - d/2$$

where α are a set of ads for an advertiser, v(i,m) is true if person i viewed media instance m, occ(a,m) is true if an advertisement a aired on media instance m. t(m) is the date that media instance m aired. c(i) is true if person i converted, T(i) is the date person i converted, and Δ(t₁,t₂) returns the days between dates t₁ and t₂. The denominator represents the number of weeks during which the viewer was able to view ads. This is limited to the set of dates when the ad was running, and when the person had an opportunity to view it.

A match to determine if a viewer both saw an ad v(i,m), at the same time as the ad aired occ(a,m) is the most computationally expensive part of the above join. It is possible to join where the media instance are one second viewing buckets—and so a match is achieved if the ad airs and the user views the media at the same second. The match can be sped up by increasing the size of the matching bucket. In addition, there are often some clock differences between MSOs and set-top box hardware units, and so using a larger time window (bucket) also helps to improve the reliability of the match. The analytics engine 274 can define a matching time window (bucket) of size B in seconds. The analytics engine 274 truncates the time stamp for the ad occurrences as well as for the viewing records with the same window or bucket. We then define a match as If viewminutes(i,m)>B*b then v(i,m)=true where b is a percentage of the window that needs to be viewed. In the examples that follow, a window size is equal to 15 minutes with b=0.7. This style of matching is not as accurate, and may incorrectly return an ad view when the user had actually channel-switched. Therefore, in one embodiment the Adweight is an upper bound on the true AdWeight. However it creates up to a 900× speedup which is valuable in practice. After using this technique, the ad weight calculated for the landscape may be reduced as follows:

$$A(i,\alpha)'=A(i,\alpha) \cdot b$$

Targeting is challenging on TV because ads are not routed to individuals. Instead, ads are placed on specific programs, rotations, times of day, etc. In order to do this, a definition of targeting is used herein which is compatible with TV systems. Targetedness, or degree of targetedness, is the percentage of viewers who are like the converting customer. The degree of targetedness is equal to "probability of buyer". Accordingly, the higher a targetedness rating for a viewer, the greater the probability that the viewer will convert. We provide two targetedness metrics: (a) Direct Targeting and (b) Demographic Targeting.

Direct Targeting looks at what known buyers (converters) of the product are watching, and then creates a probability for each media instance. The method calculates the probability of buyer given the TV programming mix that the individual who is being scored is watching. In other words, the analytics engine reviews all programs viewed, sums up the buyers in that pool and divides by the number of viewers, as follows:

$$r(i, \alpha, \tau) = \frac{\sum_{m:v(i,m)} \sum_{j \neq i} 1 : c(j) \wedge v(j, m)}{\sum_{m,v)i,m)} \sum_{k \neq i} 1 : v(k, m)}$$

where $t(m) \leq \tau \wedge t(m) \geq \tau - d/2$ where i is an individual set-top box viewer who is being scored, m is one of the media instances which viewer i has watched, B(m) is the number of buyers viewing media program m, and V(m) is the universe of all viewers of media m. For example, if there were 10 buyers out of 100 on Program A, and 1 out of 100 on Program B, and an individual viewed only Program A and B, then their buyer probability is 5.5%.

Direct buyer probability calculation can run into difficulty when there are few conversions. Another method is to use the demographics of media to calculate the probability of a conversion from this media. Using this method, analytics engine 274 decomposes each individual set-top box viewer into a multiple element demographic variable-value vector I, which in one embodiment is a 400 element vector. Analytics engine 274 then compares the viewer demographics to the demographics of purchasers of the advertiser's product P. This method has the advantage that it will work across all possible TV programs, regardless of the potential sparsity of buyers in the population. Demographic targeting can be computed according to the following equation:

$$r(i, \alpha, \tau) = \frac{P \cdot I}{\|P\| \cdot \|I\|}$$

The function for estimated conversions due to TV, for any individual i then becomes:

$$E[Conv(i, \alpha, \tau) | A(i, \alpha, \tau), r(i, \alpha, \tau), \tau] =$$
$$A(i, \alpha, \tau) \cdot f(r(i, \alpha, \tau), \tau) = A(i, \alpha, \tau) \cdot [C_r \cdot r(i, \alpha, \tau) + O_z]$$

Where $A(i,\alpha,\tau)$ is the Ad Weight in impressions per Million Households per week (Imp/MHH/Wk), and f is a Targeting function which maps $r(i,\alpha,\tau)$ to expected conversions per impression, and which can be estimated by least squares regression of r against observed conversion rate per impression, $O_z$ are conversions occurring for untargeted impressions, and $C_z$ are the conversions per targeted impression. The conversion per targeted impression function is also able to vary with the time-period being observed, and analytics engine 274 can use this to create a time-series of conversions due to television.

In an example, the demographics targeting method was applied for a large brick and mortar retailer in United States to compute targetedness. The company tracked approximately 120,000 unique customer sales per month. These converting customers were joined to STB viewers using the three-way anonymization method to ensure that identities of viewers and purchasers were not disclosed in any way.

Figure 5:
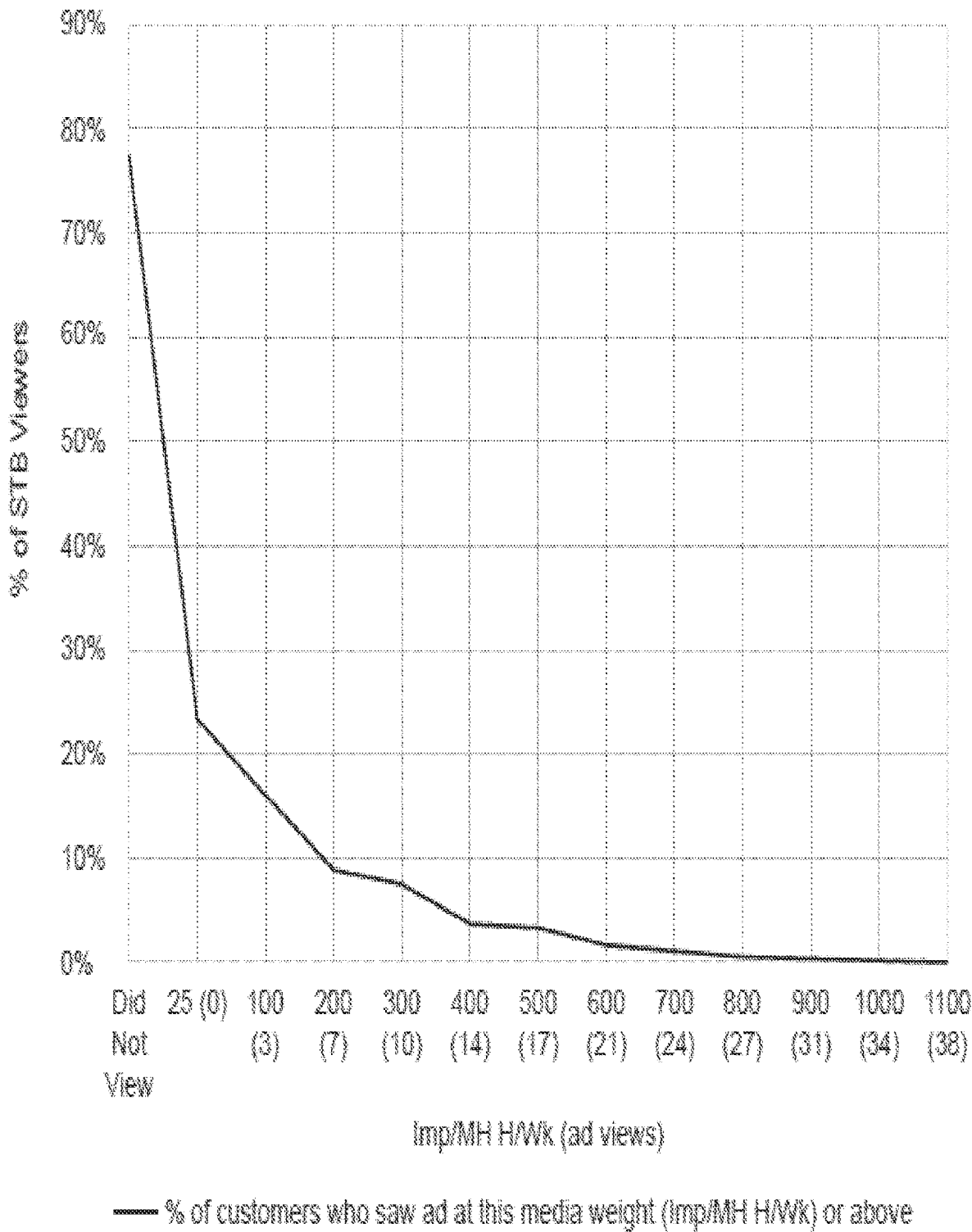
FIG. 5 illustrates a percentage of set-top box viewers who saw 1, 2, 3 or more ads.

Over an 8 month period, there were 609 positive instances of STB viewers who converted. The retailer had run approximately 643 Imp/MHH/Wk for 8 months. Based on this, 16.19% of the STB viewers had been watching TV at exactly the time that the retailer ad played and had seen the ad at least once during the 34 weeks that were monitored. Only 0.26% of viewers saw the ad per week. FIG. 5 illustrates a percentage of set-top viewers who saw 1, 2, 3 or more ads.

Conversion rate increases were observed with the number of times that the ad was seen (e.g., with increased ad weight). Without seeing the ad the conversion rate is only 0.048%. If the ad is seen once per week then the conversion rate increases by a factor of 7.5 to 0.36%.

Figure 6:
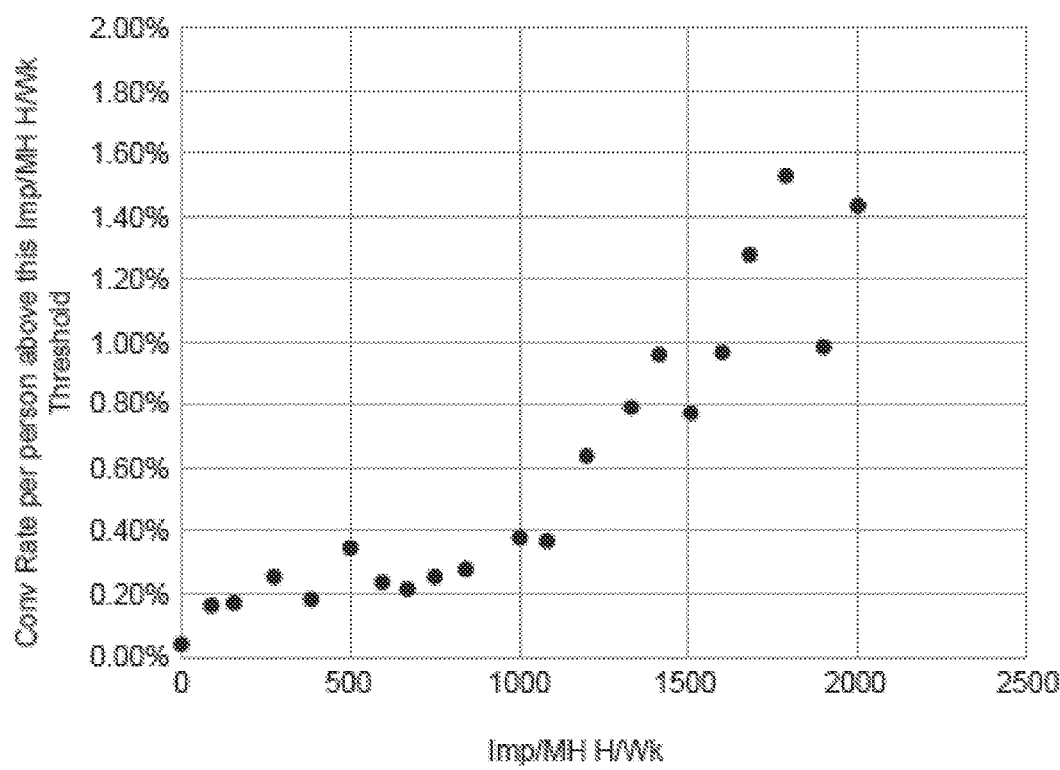
FIGS. 6-7 illustrate advertisement weight verses conversion probability, in accordance with one embodiment.
Figure 7:
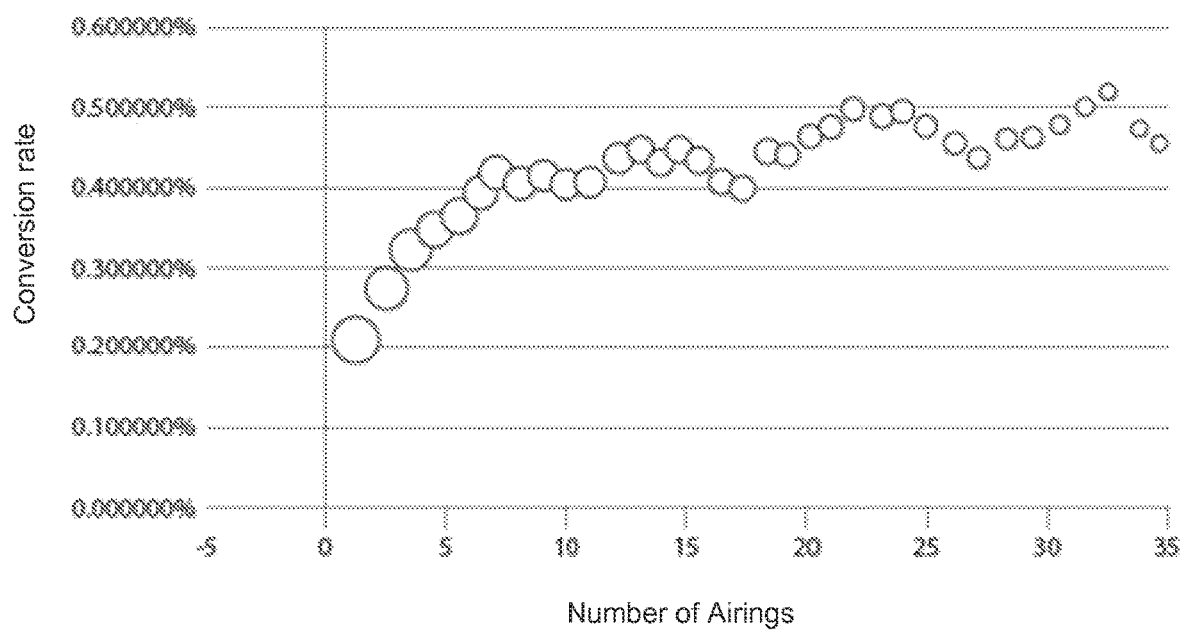

Advertisement weight verses conversion probability is shown in FIG. 6. As shown, increases in the number of impressions per MHH per week cause corresponding increases in conversion probability. FIG. 7 illustrates conversion probability as a function of advertising weight expressed as total number of impressions. As the total number of impressions (views) of an ad increase, the probability that a viewer will purchase the advertised product or service increases, as shown.

Figure 8:
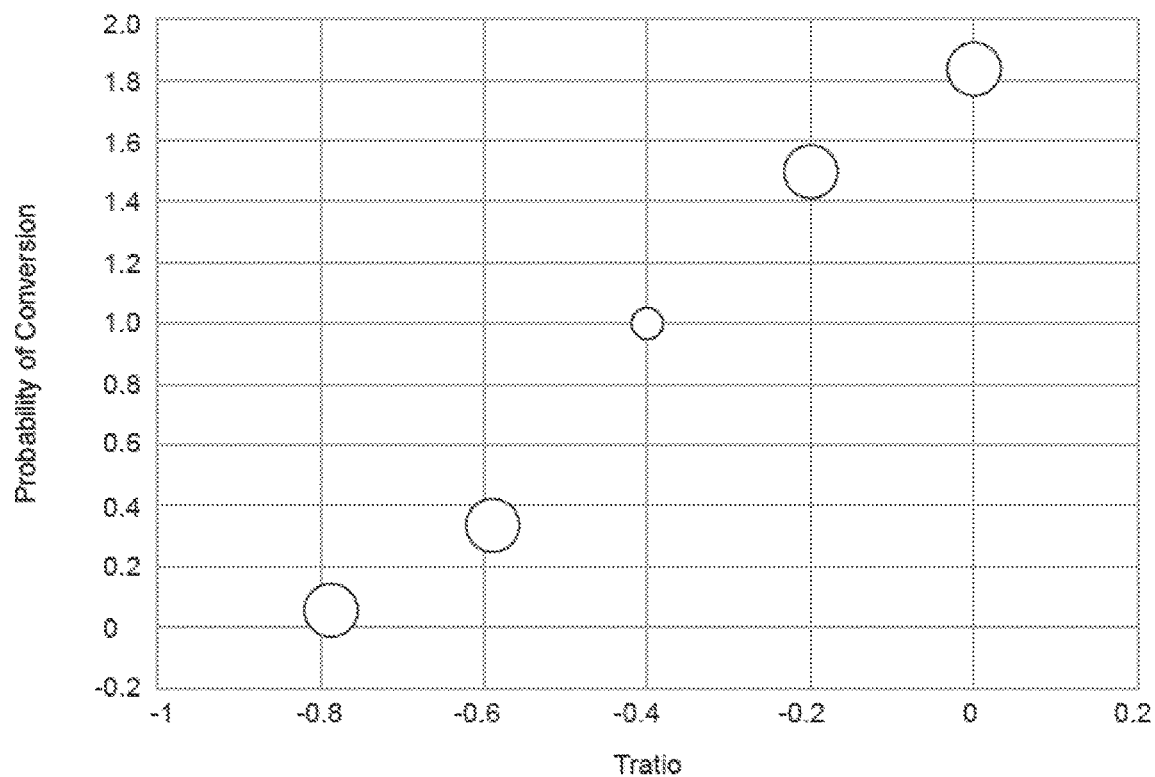
FIGS. 8-9 show the relationship between demographic match and probability of conversion, in accordance with one embodiment.
Figure 9:
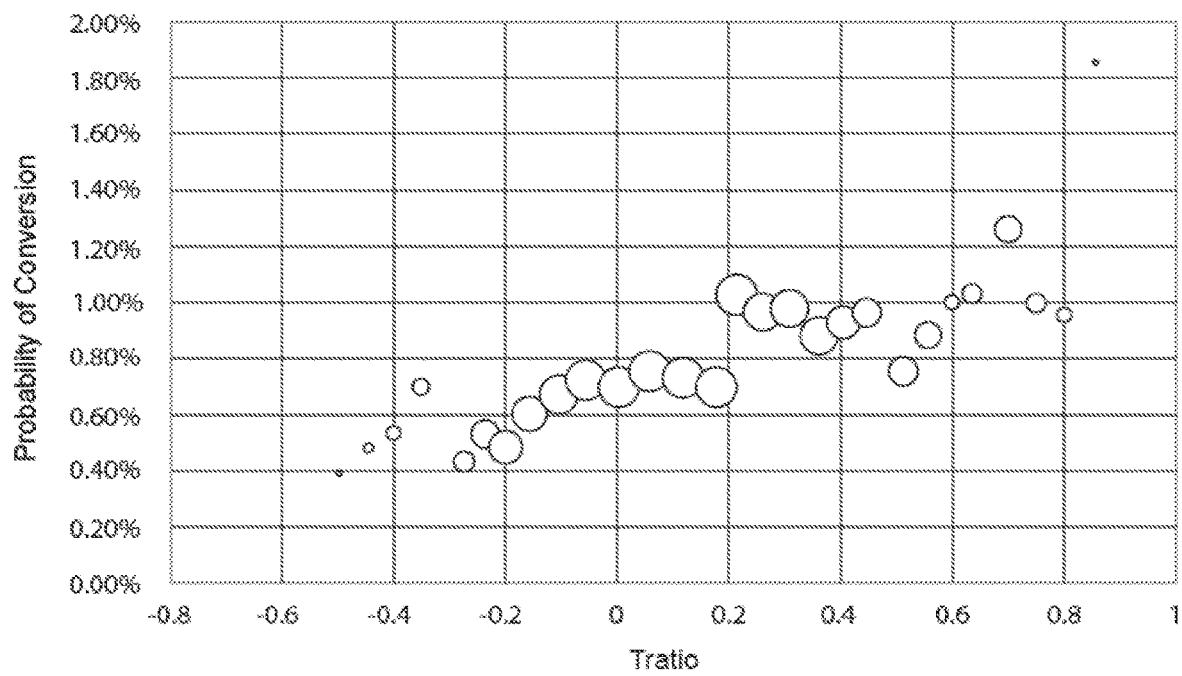

Conversion rate also increases with targeting (also referred to as targetedness), which is represented mathematically by a Tratio value. FIG. 8 shows the relationship between demographic match and probability of conversion. As the degree of targetedness increases, the probability that a viewer of the ad will purchase the product or service that is advertised increases, as shown. FIG. 9 is another graph showing the probability of conversion after a single advertisement impression based on degree of targetedness.

Figure 10:
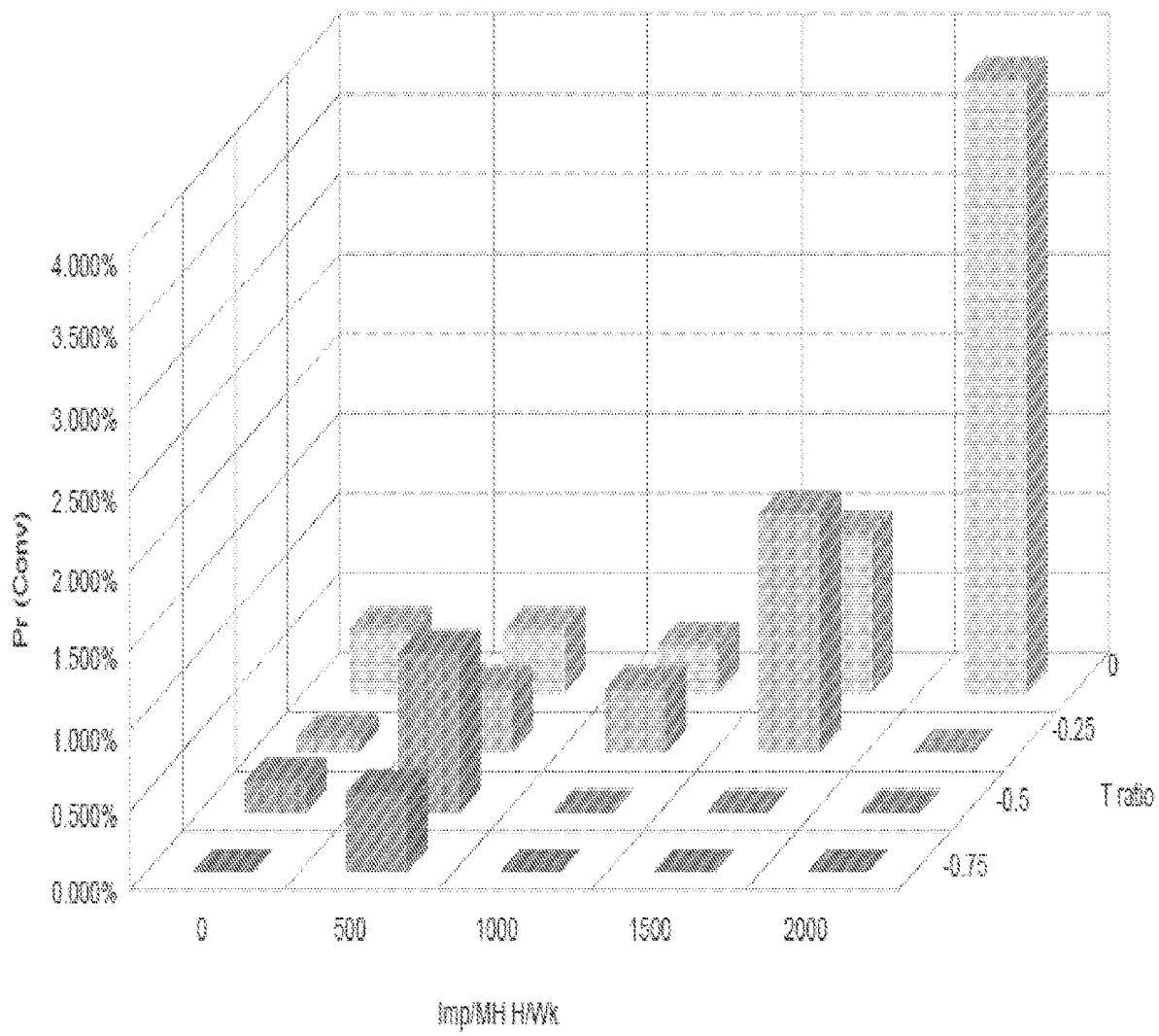
FIG. 10 illustrates a graph showing combined ad-weight and targeting (targetedness) verses probability of conversion, in accordance with one embodiment.

Combining ad weight and targeting, the graph shown in FIG. 10 is produced. This buckets the data into discrete combinations of ad weight and targeting. It can be seen clearly that high ad weight, high targeted media produces a high conversion rate. Fitting this data using the above linear function, the conversion function from television ad weight given a degree of targeting as measured by $r(i,\alpha,\tau)$ can be estimated as:

$$E[Conv(i,\alpha,\tau)]=A(i,\alpha,\tau) \cdot [0.000037 \cdot r(i,\alpha,\tau)+0.000029]$$

Based on the ad spending of 643 Imp/MHH/Wk recorded over the 8 months, and targetedness of r=0.0778, this means that (643/1000)·115000000·0.000037·0.0778=2,236 conversions per week were due to TV, 5,289 conversions occurred per week, meaning that TV advertisements had lifted sales by 88% over this period.

Analytics engine 274 can identify the value of TV targeting and ad weight, and use that to identify conversions due to television over any period. The above function is based on empirically collected data. Analytics engine 274 can generate a similar function, but which is local in time. The similar function effectively models different behavior during different times of the year. A spline version of this function is below where G is a radial basis function, z are centroids for time, and $C_z$ maps targetedness to conversions per impression, where:

$$E[Conv(i, \alpha, \tau)] = A(i, \alpha, \tau) \cdot \sum_{z} C_x \cdot G(\tau - t_z) \cdot r(i, \alpha, \tau)$$

In one embodiment, analytics engine 274 determines counts of previous ad exposures for purchasers and/or non-purchasers of the advertised product or service. Analytics engine 274 may also determine buyer exposure to ads, and report on such buyer exposure. For example, analytics engine 274 may use the combined data to compute the total number of buyers who were exposed to ads. Such exposures may be reported out by time. All purchasers may be used as a set of total converters, and may be compared against the number of converters who also were exposed to the advertisement campaign to determine whether the ads are being delivered to the right audience. The ratio of purchasers who viewed the ads to total purchasers may be used as a quality metric to measure the appropriateness of the selected programs for the ad campaign.

The platform consumers 205 may include an agency 230 (e.g., an advertising agency) and an advertiser 232 (e.g., a manufacturer of a product or service who wishes to advertise that product or service). Results of the real time tracking, advertisement optimization suggestions, advertising models, etc. may be provided to the platform consumers 205 to enable them to fully understand and optimize their advertisement campaigns in real time or pseudo-real time (e.g., while the campaigns are ongoing).

In one embodiment, audience data 220 and sales data 225 are anonymized by an anonymization service before the data is provided to advertisement platform 215. The anonymization service may extract personally identifiable information (PII) from the data feeds and route the PII to a separate pipeline for secure storage. The anonymization service may additionally add unique identifiers to each article of data.

In another embodiment, the system uses a pool of buyers—people who have previously bought the product or used the service—and then provides for tracking of how well the ad campaign is doing at hitting those buyers, or others that are predicted to be high-probability buyers. This is done by measuring the number of ad exposures of persons in the buying set, and counting up those exposures each day. It is then possible to report on several metrics to show how well the campaign is performing including (a) how many buyer exposures per day were generated, (b) how many distinct buyers were delivered the ad per day, (c) what was the cost per buyer reached, and (d) how many buyers per million impressions (BPM) were reached. The latter metric of buyers per million impressions or BPM is a very useful metric to show the degree of targeting in the ad campaign. These metrics can also be reported by program, station-day-hour, and other units of purchase, and so show whether media purchases were effective in getting the ad in front of buyers.

Figure 11:
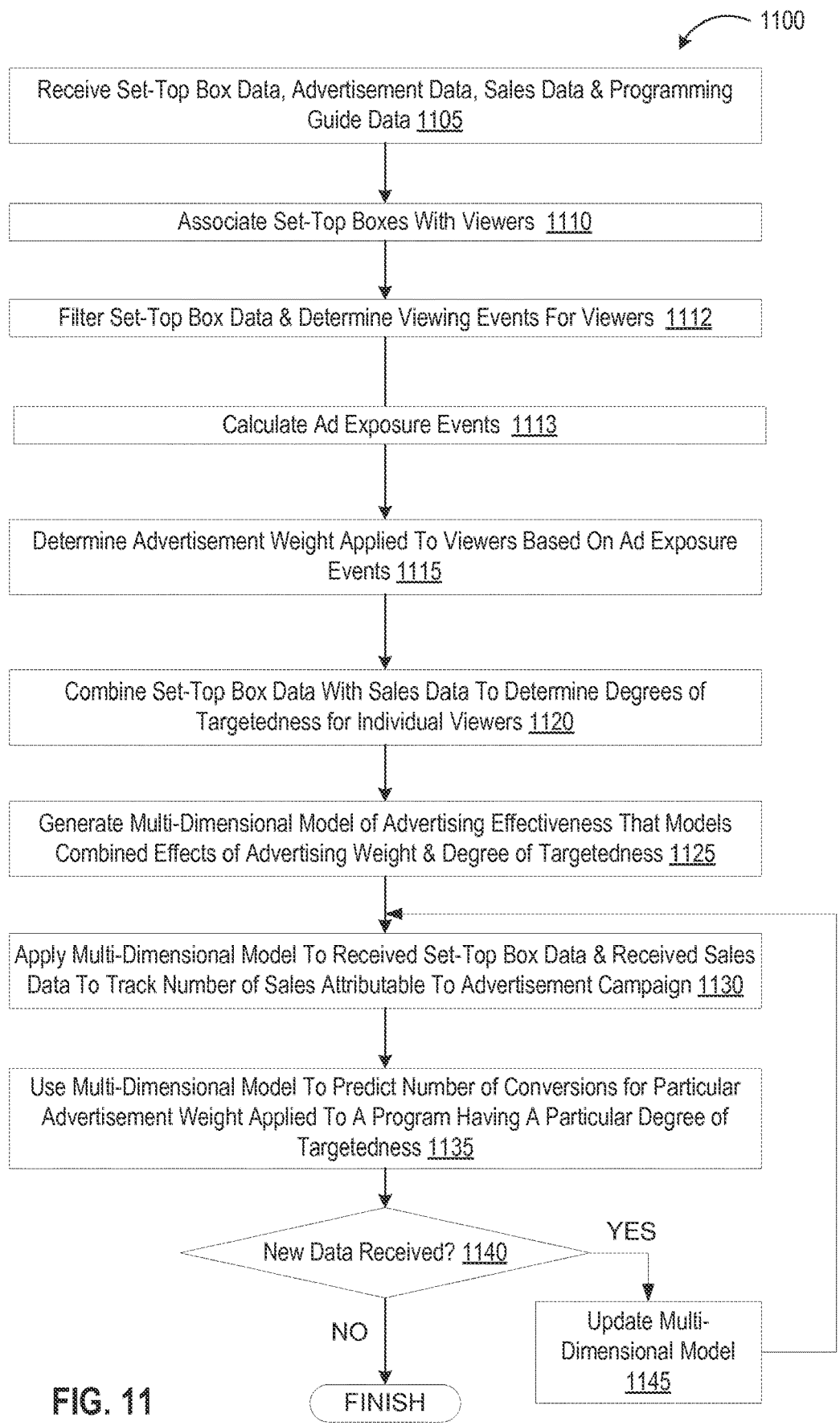
FIG. 11 is a flow diagram illustrating a method for real time tracking of an advertisement campaign, according to one embodiment.
Figure 13:
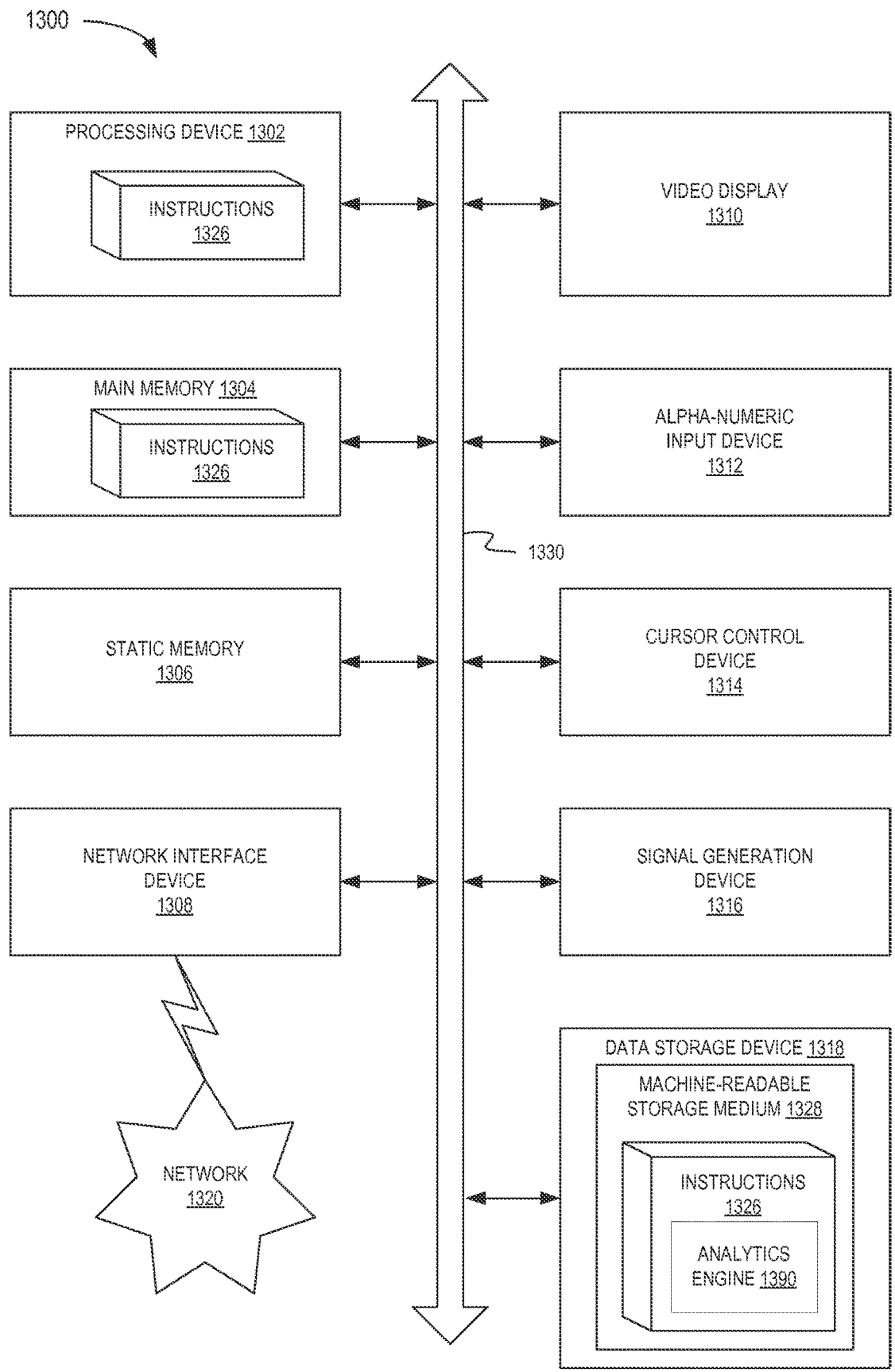
FIG. 13 illustrates a diagrammatic representation of a machine in the exemplary form of a computer system.

FIG. 11 is a flow diagram illustrating a method 1100 of tracking and managing an advertisement campaign based on set-top box, according to one embodiment. The method 1100 may be performed by processing logic that comprises hardware (e.g., processor circuitry, dedicated logic, programmable logic, microcode, etc.), software (e.g., instructions run on a processor to preform hardware simulation), or a combination thereof. The processing logic is configured to track and manage an advertisement campaign such as a national advertisement campaign. In one embodiment, method 1100 may be performed by a processor, as shown in FIG. 13. In one embodiment, method 1100 is performed by an advertisement platform (e.g., by analytics engine 274 and data source combiner 278 of advertising platform 215 discussed with reference to FIG. 2).

Referring to FIG. 11, at block 1105 of method 1100 processing logic receives set-top box data, advertisement data, sales data and programming guide data. The set-top box data and sales data may have been anonymized by a third party anonymization service as described above herein. Accordingly, the received set-top box data and sales data may not include any personally identifying information (PII). At block 1110, processing logic associates set-top boxes with viewers. Processing logic may make these associations based on billing and/or customer records of set-top box users collected from service providers that provide services to the set-top boxes (e.g., from cable television providers, satellite television providers, and so on). Set-top box data may be associated with a viewer who has signed up for the service with the service provider. This viewer may be representative of a household in one embodiment. Additional data on households may be received from third party services such as Axciom. The additional household data may identify multiple viewers who live in a household, wherein one of the viewers is the viewer associated with a user account (e.g., who pays the bills for the television service). Subsets of the set-top box data associated with a household may be associated with different viewers of the household.

At block 1112, processing logic filters the set-top box data to determine viewing events. The set-top box data may be received as a series of set-top box events, which may include power on events, power off events, tune events (tuning to a specific channel), and numerous other types of events. Processing logic may filter out all events other than tune events and power on/off events. Processing logic may then use the tune events and power on/off events to determine viewing events and to generate viewing event records, as set forth above. A viewing event may have a specified time window. For example, in one embodiment, 15 minute viewing events are generated. Alternatively, 30 minute viewing events, hour viewing events, and so forth may be generated. Each viewing event may be associated with one or more viewers of a household. Processing logic may update the viewing event records by adding information from the received programming guide data. Processing logic determines what programs are associated with each viewing event, and adds the program data to the viewing event record.

At block 113, processing logic calculates advertisement exposure events based on combining the viewing events with the advertisement data. Processing logic further combines the advertisement data with the viewing event records by determining whether ads were aired during a program associated with a viewing event record and/or how many ads were aired during the program. The number of aired ads may then be added to the viewing event record. Thus, each viewing event record includes an ad weight for that viewing event record. At block 1115, the viewing event records for an individual viewer are combined to determine the ad weight for that viewer. Additionally, viewing event records for all viewers may be combined to determine a total average ad weight applied to viewers and/or other statistical information regarding ad weight (e.g., average ad weight of all viewers for a particular program).

In one embodiment, processing logic may determine that a viewer viewed a portion of a program, and may assign a determined program level advertising weight for the portion of the program. For example, if an ad is shown 4 times in a program, then the program may have an ad weight of 4. If a viewer viewed ¼ the program, then the viewing event for the viewer of the program may be assigned an ad weight of 1. In one embodiment, a time window is set for each viewing event (e.g., 15 minutes). An ad exposure event may be determined if a viewer viewed a program for at least a threshold amount of the time window (e.g., 10% of the time window).

At block 1120, processing logic combines the set-top box data with the sales data to determine a degree of targetedness for each individual viewer. In one embodiment, the sales data is matched against the viewing event records based on name and address or based on a unique identifier associated with a household or viewer. Any of the aforementioned techniques for determining degree of targetedness may be used. For example, processing logic may identify all programs viewed by a viewer, determine a first quantity of viewers that viewed a program, determine a second quantity viewers that also purchased the product or service, and divide the second quantity by the first quantity to determine the degree of targetedness for the viewer. Similar measurements may also be made at the household level. Alternatively, processing logic may generate a first multi-level vector based on demographic information for the viewer, generate a second multi-dimensional vector for the buyers of the product or service, and determine a distance between the first multi-dimensional vector and the second multi-dimensional vector.

At block 1125, processing logic generates a multi-dimensional model of advertising effectiveness that models combined effects of advertising weight and degree of targetedness. The multi-dimensional model may be developed using the computed degrees of targetedness and ad weights of the individual viewers in combination with the sales data. These values may be used along with received data to determine an effect that the ad weight has on sales metrics and to determine an effect that the degree targetedness has on the sales metrics. At block 1130, processing logic applies the multi-dimensional model to the received set-top box data and the received sales data to track a number of sales that are attributable to the advertisement campaign. At block 1135, processing logic uses the multi-dimensional model to predict a number of conversions for a particular advertisement weight applied to a program having a particular degree of targetedness. For example, viewers of a particular program may have a demographic similarity to the purchasers of the product or service, represented by the degree of targetedness or Tratio. The multi-dimensional model may be used to determine the predicted number of conversions that will occur if 1 ad per week is shown, if 4 ads per week are shown, and so on. This data may be used to manage the advertisement campaign.

At block 1140, processing logic determines whether new data (e.g., new set-top box data and/or new sales data) has been received. If new data is received, the method continues to block 1145 and the multi-dimensional model is updated using the new data. This may include first performing the operations of blocks 1110-1120 for the new data. Once the multi-dimensional model is updated, the method returns to block 1130. If no new data is received, the method ends.

Figure 12:
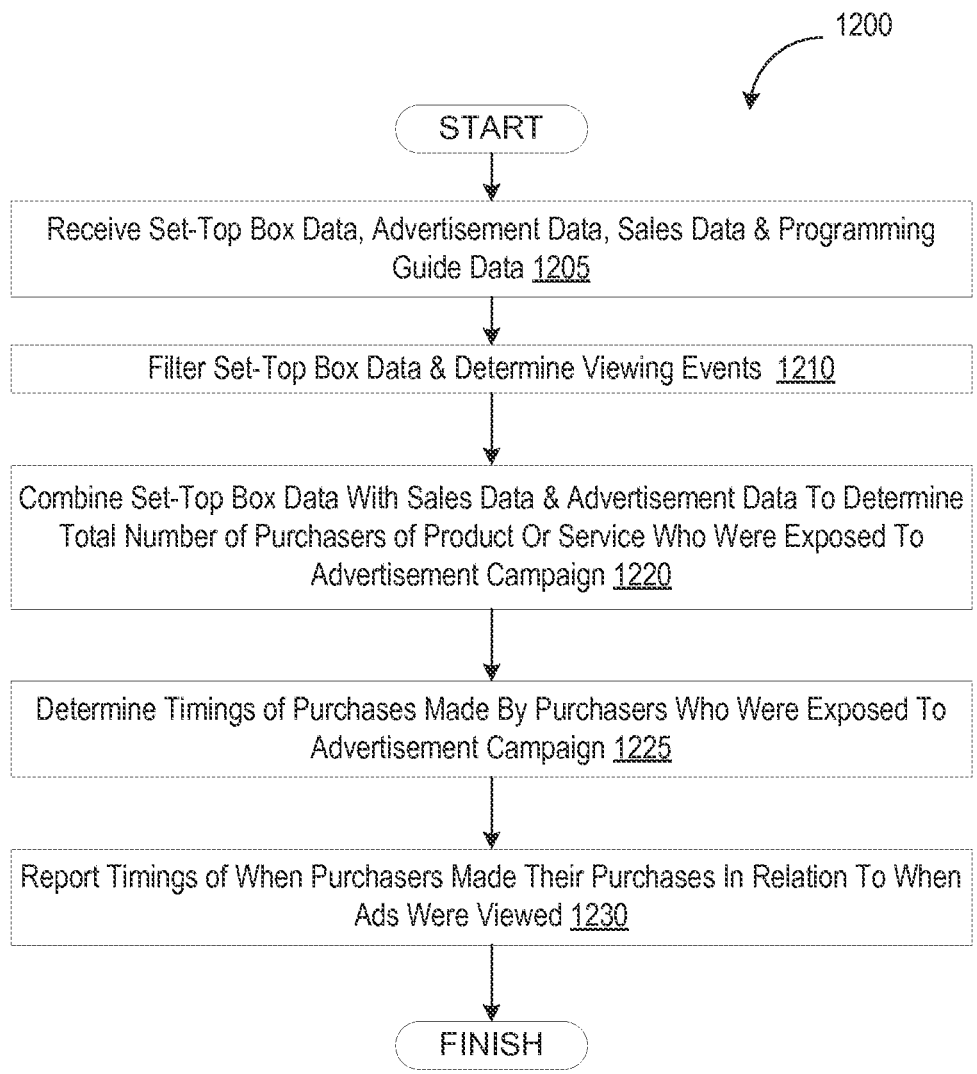
FIG. 12 is a flow diagram illustrating a method for real time tracking of an advertisement campaign, according to another embodiment.

FIG. 12 is a flow diagram illustrating a method 1200 of tracking and managing an advertisement campaign based on set-top box data, according to one embodiment. The method 1200 may be performed by processing logic that comprises hardware (e.g., processor, circuitry, dedicated logic, programmable logic, microcode, etc.), software (e.g., instructions run on a processor to perform hardware simulation), or a combination thereof. The processing logic is configured to track and manage an advertisement campaign such as a national advertisement campaign. In one embodiment, method 1200 may be performed by a processor, as shown in FIG. 13. In one embodiment, method 1200 is performed by an advertisement platform (e.g., by analytics engine 274 and data source combiner 278 of advertising platform 215 discussed with reference to FIG. 2).

Referring to FIG. 12, at block 1205 of method 1200 processing logic receives set-top box data, advertisement data, sales data and programming guide data. The set-top box data and sales data may have been anonymized by a third party anonymization service as described above herein. Accordingly, the received set-top box data and sales data may not include any personally identifying information (PII).

At block 1210, processing logic filters the set-top box data to determine viewing events. At block 1220, processing logic combines the set-top box data with the sales data and the advertisement data to determine a total number of purchasers of the product or service who were exposed to the advertisement campaign. At block 1225, processing logic determines timings of the purchases made by the purchasers who were exposed to the advertisement campaign. At block 1230, processing logic reports the timings of when purchasers made their purchases in relation to when the ads were viewed. Accordingly, processing logic may determine how many days typically elapsed between viewing of an ad for the product or service and purchase of the product or service. Processing logic may also determine the number of airings that occurred before the product or service was purchased, and other information. Additionally, processing logic may report on timings of when products or services were purchased without indicating an amount of time that elapsed since a most recent ad exposure.

FIG. 13 illustrates a diagrammatic representation of a machine in the exemplary form of a computer system 1300 within which a set of instructions, for causing the machine to perform any one or more of the methodologies discussed herein, may be executed. The system 1300 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1300 includes a processing device (e.g., one or more processors) 1302, a main memory 1304 (e.g., read-only memory (ROM), flash memory, dynamic random access memory (DRAM) such as synchronous DRAM (SDRAM)), a static memory 1306 (e.g., flash memory, static random access memory (SRAM)), and a data storage device 1318, which communicate with each other via a bus 1330.

Processing device 1302 represents one or more general-purpose processors such as a microprocessor, central processing unit, or the like. More particularly, the processing device 1302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1302 may also be one or more special-purpose processing devices such as an application specific integrated circuit (ASIC), a field programmable gate array (FPGA), a digital signal processor (OSP), network processor, or the like. The processing device 1302 is configured to execute the instructions 1326 for performing the operations and steps discussed herein.

The computer system 1300 may further include a network interface device 1308 which may communicate with a network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse, a touch screen, a touch pad, a stylus, etc.), and a signal generation device 1316 (e.g., a speaker).

The data storage device 1318 may include a computer-readable storage medium 1328 on which is stored one or more sets of instructions (e.g., instructions 1326 of an analytics engine 1390) embodying any one or more or the methodologies or functions described herein. The instructions 1326 may also reside, completely or at least partially, within the main memory 1304 and/or within the processing device 1302 during execution thereof by the computer system 1300, the main memory 1304 and the processing device 1302 also constituting computer-readable media. The instructions may further be transmitted or received over a network 1320 via the network interface device 1308.

While the computer-readable storage medium 1328 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps loading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically otherwise as apparent from the above discussion, it is appreciated that throughout the description, discussions utilizing terms such as "receiving," "generating," "determining," "calculating," "introducing," "providing," "selecting," "updating," "adjusting," "modifying," "computing," "using," "applying," "comparing," "analyzing," "tracking," "incorporating," "combining," "predicting," "performing," "reducing," "increasing," "making," "monitoring," "maintaining," "updating," "testing," "measuring," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical media, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
associating a plurality of electronic devices with a plurality of viewers;
enriching electronic content device data for the plurality of electronic devices with consumer enrichment data, the electronic content device data identifying a plurality of purchasers;
setting a time window associated with a portion of each electronic content instance among a plurality of electronic content instances on which a message was presented based on a predetermined time window size, the time window size being greater than a duration of the message;
determining whether an individual viewer of the plurality of viewers viewed the electronic content instance for at least a threshold percentage of the time window;
upon determining that the individual viewer viewed the electronic content instance for at least the threshold percentage of the time window, identifying a single message exposure event for the individual viewer, wherein the message exposure event comprises a truncated time stamp for a time period that the message was presented and viewed by the individual viewer;
calculating, for each viewer of the plurality of viewers, message weight as a function of a number of exposures of the message as applied to the viewer based on the message exposure event;
calculating, for each viewer, a score representing a degree-of-targetedness between a target for the message and the viewer;
generating a multi-dimensional model of message effectiveness that models combined effects of the message weight and a degree of targetedness based on a combination of message weights and degrees of targetedness for the plurality of viewers; and
applying the multi-dimensional model to the electronic content device data and viewer activity data to track viewer activity attributable to the message.

2. The method of claim 1, wherein associating the plurality of electronic content devices with the plurality of viewers comprises:
associating each electronic content device of the plurality of electronic content devices with a household of a plurality of households based on billing or subscription records of a person who is paying for a television service provided by one of the plurality of electronic content devices; and
associating each household of the plurality of households with additional persons in the household based on third party data about the additional persons residing within the household.

3. The method of claim 1, wherein the degree of targetedness is further calculated by measuring a probability that an individual exposed to the message perform an activity, and wherein determining the degree of targetedness as applied to an individual viewer comprises:
identifying programs viewed by the individual viewer;
determining a first quantity of individual viewers that viewed the programs;
determining a second quantity of the individual viewers that also; and
dividing the second quantity by the first quantity.

4. The method of claim 1, further comprising:
managing messaging based on the message weight and the degree-of-targetedness.

5. The method of claim 1, wherein the score representing the degree-of-targetedness is a plurality of values including a direct targeting metric and a demographic targeting metric, and the demographic targeting metric is based on a probability of viewer activity from a media instance on which the message was presented.

6. A tangible, non-transitory computer readable storage medium storing instructions that, when executed by a computing system, causes the computing system to perform a method including:
associating a plurality of electronic devices with a plurality of viewers;
enriching electronic content device data for the plurality of electronic devices with consumer enrichment data;
setting a time window associated with a portion of each electronic content instance among a plurality of electronic content instances on which a message was presented based on a predetermined time window size, the time window size being greater than a duration of the message;
determining whether an individual viewer of the plurality of viewers viewed the electronic content instance for at least a threshold percentage of the time window;
upon determining that the individual viewer viewed the electronic content instance for at least the threshold percentage of the time window, identifying a single message exposure event for the individual viewer, wherein the message exposure event comprises a truncated time stamp for a time period that the message was presented and viewed by the individual viewer;
calculating, for each viewer of the plurality of viewers, message weight as a function of a number of exposures of the message as applied to the viewer based on the message exposure event;
calculating, for each viewer, a score representing a degree-of-targetedness between a target for the message and the viewer;
generating a multi-dimensional model of message effectiveness that models combined effects of the message weight and a degree of targetedness based on a combination of message weights and degrees of targetedness for the plurality of viewers; and
applying the multi-dimensional model to the electronic content device data and viewer activity data to track viewer activity attributable to the message.

7. The tangible, non-transitory computer readable storage medium of claim 6, wherein associating the plurality of electronic content devices with the plurality of viewers comprises:
associating each electronic content device of the plurality of electronic content devices with a household of a plurality of households based on billing or subscription records of a person who is paying for a television service provided by one of the plurality of electronic content devices; and
and associating each household of the plurality of households with additional persons in the household based on third party data about the additional persons residing within the household.

8. The tangible, non-transitory computer readable storage medium of claim 6, the operations further comprising:
using the multi-dimensional model to predict a number of viewer actions for a particular message weight applied to a program having a particular degree of targetedness.

9. The tangible, non-transitory computer readable storage medium of claim 6, wherein determining a message weight as applied to an individual viewer comprises:
receiving programming guide data;
analyzing the electronic content device data and combining with the programming guide data to determine programs watched by the individual viewer over a time period;
calculating the message exposure events for the individual viewer by further combining messaging data to the combined viewing data and programming data; and
aggregating the message exposure events for the individual viewer.

10. The tangible, non-transitory computer readable storage medium of claim 6, wherein the degree of targetedness is further calculated at least in part by measuring a probability that an individual exposed to the message perform an activity, and wherein determining the degree of targetedness as applied to an individual viewer comprises:
identifying programs viewed by the individual viewer;
determining a first quantity of individual viewers that viewed the programs;
determining a second quantity of the individual viewers that performed the activity; and
dividing the second quantity by the first quantity.

11. The tangible, non-transitory computer readable storage medium of claim 6, the operations further comprising:
managing messaging based on the message weight and the degree-of- targetedness.

12. A system comprising:
a data storage device storing instructions in an electronic storage medium; and
a processor configured to execute the instructions to perform a method including:
associating a plurality of electronic devices with a plurality of viewers;
enriching electronic content device data for the plurality of electronic devices with consumer enrichment data;
setting a time window associated with a portion of each electronic content instance among a plurality of electronic content instances on which a message was presented based on a predetermined time window size, the time window size being greater than a duration of the message;
determining whether an individual viewer of the plurality of viewers viewed the electronic content instance for at least a threshold percentage of the time window;
upon determining that the individual viewer viewed the electronic content instance for at least the threshold percentage of the time window, identifying a single message exposure event for the individual viewer, wherein the message exposure event comprises a truncated time stamp for a time period that the message was presented and viewed by the individual viewer;
calculating, for each viewer of the plurality of viewers, message weight as a function of a number of exposures of the message as applied to the viewer based on the message exposure event;
calculating, for each viewer, a score representing a degree-of-targetedness between a target for the message and the viewer;
generating a multi-dimensional model of message effectiveness that models combined effects of the message weight and a degree of targetedness based on a combination of message weights and degrees of targetedness for the plurality of viewers; and applying the multi-dimensional model to the electronic content device data and viewer activity data to track viewer activity attributable to the message.

13. The system of claim 12, wherein the system is further configured to:
manage messaging based on the message weight and the degree-of-targetedness.

14. The system of claim 12, wherein the score representing the degree-of-targetedness is a plurality of values including a direct targeting metric and a demographic targeting metric, and the demographic targeting metric is based on a probability of viewer activity from a media instance on which the message was presented.

* * * * *